United States Patent [19]
Okada

[11] Patent Number: 5,943,169
[45] Date of Patent: *Aug. 24, 1999

[54] IMAGE BLUR PREVENTING DEVICE

[75] Inventor: Tadanori Okada, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,082

[22] Filed: Apr. 21, 1997

Related U.S. Application Data

[63] Continuation of application No. 08/220,509, Mar. 31, 1994, abandoned.

[30] Foreign Application Priority Data

Apr. 1, 1993 [JP] Japan ................................. 5-096514

[51] Int. Cl.$^6$ ................................................. G02B 27/64
[52] U.S. Cl. ........................... 359/557; 359/554; 396/52; 396/55
[58] Field of Search .................................. 359/554–557, 359/694–706, 813, 823; 354/468, 484, 202; 396/52–55, 277–280, 301–302

[56] References Cited

U.S. PATENT DOCUMENTS

| | | | |
|---|---|---|---|
| 3,942,864 | 3/1976 | Numbers | 359/511 |
| 5,117,246 | 5/1992 | Takahashi et al. | 396/55 |
| 5,164,761 | 11/1992 | Isono et al. | 354/468 |
| 5,181,056 | 1/1993 | Noguchi et al. | 359/554 |
| 5,398,132 | 3/1995 | Otani | 359/557 |
| 5,602,675 | 2/1997 | Okada | 359/554 |

*Primary Examiner*—Thong Nguyen
*Attorney, Agent, or Firm*—Fitzpatrick, Cella, Harper & Scinto

[57] ABSTRACT

An image blur prevention apparatus including a detection device that detects a preparatory operation of an operation portion, such as the open or closed state of a cover member for a battery chamber, and, when the detection device detects a preparatory operation of the operation portion (indicating, e.g., a high probability of detachment of the power source), a movable member of the image blur prevention device is locked at a predetermined position, even if such detection occurs in the course of an image blur prevention operation.

21 Claims, 6 Drawing Sheets

IMAGE BLUR PREVENTING DEVICE

This application is a continuation of application Ser. No. 08/220,509 filed Mar. 31, 1994, now abandoned.

BACKGROUND OF THE INVENTION

1. Field of the Invention

The present invention relates to an image blur preventing device, for preventing image blur generated for example by hand vibration.

2. Related Background Art

For image blur prevention, there have conventionally been proposed various devices based on a principle of detecting hand vibration and displacing a correcting lens according to the detected value, thereby correcting the variation of image in optical axis. More specifically, the vibration is detected by a vibration sensor such as an angular acceleration meter or an angular speedometer, then the angular displacement is calculated electrically or mechanically, based on a signal from the vibration sensor, and the correcting lens is driven by information corresponding to the angular displacement.

The correction with the above-mentioned correcting lens can be achieved, for example, by effecting a parallel shift of the optical axis in a part of the phototaking lens, tilting the optical axis, a combination of these two methods, or providing a variable-angle prism (VAP) in front of the phototaking optical system.

Among these methods, decentralization of a part of the phototaking lens is achieved in the following manner. A base member of a blur correction unit is connected to a link member movable in a direction perpendicular to the phototaking optical axis (for example in the pitch direction), and a correcting lens frame, supporting a correcting lens, is supported by the link member so as to be movable in a direction perpendicular to the above-mentioned direction (for example in the yaw direction), whereby the correcting lens frame is rendered movable, with respect to the base member, in the pitch or yaw direction perpendicular to the optical axis.

As the actuators for driving the correcting lens, the correcting lens frame is provided with voice coils respectively corresponding to the pitch and yaw directions perpendicular to the phototaking optical axis, and yokes and magnets corresponding to these voice coils are fixed on the base member.

Also for detecting the eccentric position of the correcting lens in the pitch and yaw directions, light-emitting elements (or light-receiving elements) are fixed on the correcting lens frame while corresponding light-receiving elements (or light-emitting elements) are fixed on the base member, and the position of the correcting lens is detected by the amount of light emitted by the light-emitting elements and received by the light-receiving elements, and precise position control of the correcting lens is achieved by information corresponding to the thus detected position.

Such a blur correcting device may be powered by the power source of the main camera body, or may have an exclusive power source in consideration of the power capacity or function of the camera system and in order to enable automatic focusing or diaphragm driving simultaneously with the blur correction.

The function of the blur correcting device may be initiated by an external start switch which powers the blur correcting control circuit, vibration sensor, correcting optical system drive circuit, etc., to activate the blur correcting operation, or by an external switch and a shutter releasing signal of the camera, namely when the shutter release button of the camera is depressed by a half stroke while the external switch is turned on. Also the blur correcting operation may be terminated by turning off the external switch, or, even while the external switch is turned on, by an exposure operation of the camera by a full-stroke depression of the shutter release button or by the lapse of a predetermined time after the half-stroke depression of the shutter release button is terminated. At such termination, the correcting optical system is driven to a position where the optical axis thereof coincides with that of the phototaking lens and is fixed by mechanical locking means before the power supply is cut off.

Also there is proposed, as disclosed in the U.S. Pat. No. 5,181,056, a configuration in which the locking means for the correcting optical system is rendered operable by the biasing force of a spring and the correcting optical system can be locked by releasing an engaging member with a limited amount of electric power. Also there is known a configuration having a separate back-up power source which, in case the power source for blur correction becomes exhausted below a predetermined voltage or is cut off by detachment of the battery, supplies electric power to release the above-mentioned engaging member, thereby locking the correcting optical system.

However, in conventional configurations which are so designed, at the termination of the blur correcting operation, to drive the correcting lens to a position where the optical axis thereof coincides with that of the phototaking lens and to fix the correcting lens with mechanical locking means before the power supply is cut off, if such locking means is composed of a magnetic device such as a plunger and if the operator erroneously replaces the battery during the blur correcting operation or if the battery becomes detached by an external shock, the correcting lens remains unlocked and movable within the lens barrel whereby a phototaking operation becomes impossible and eventually the device itself may be damaged.

SUMMARY OF THE INVENTION

One aspect of the present invention is that a device having a movable unit for image blur prevention or a control device therefor is provided with limiting means for limiting the movement of the movable unit for image blur prevention, in response to the prediction of detachment of a unit affecting the image blur prevention. Such configuration allows to prevent inconveniences in the movable unit, generated by unnecessary drive thereof or by detachment of the above-mentioned unit affecting the image blur prevention.

Another aspect of the present invention is that a device utilizing a movable lens or a control device therefor is provided with limiting means for limiting the movement of the movable lens, in response to the prediction of detachment of a unit affecting the desired function of the movable lens. Such configuration allows to prevent inconveniences in the movable lens, generated by unnecessary movement of the movable lens or by detachment of the above-mentioned unit affecting the desired function of the movable lens.

Still another aspect of the present invention is a back-up device or an optical device for image blur prevention, comprising prediction means for predicting detachment of a power source for electric power supply to a portion for image blur prevention or of a unit including such power source, and countermeasure means for coping with the inconveniences generated by the detachment of the power source, in response to the prediction by said prediction means. Such configuration allows to prevent inconveniences generated by unexpected detachment of the power source, without relying on a back-up power source.

DETAILED DESCRIPTION OF THE PREFERRED EMBODIMENTS

Now the present invention will be clarified in detail by preferred embodiments thereof shown in the attached drawings. In the following embodiments, image blur is detected by the detection of vibration of the camera, etc.

[First embodiment]

Figure 1:
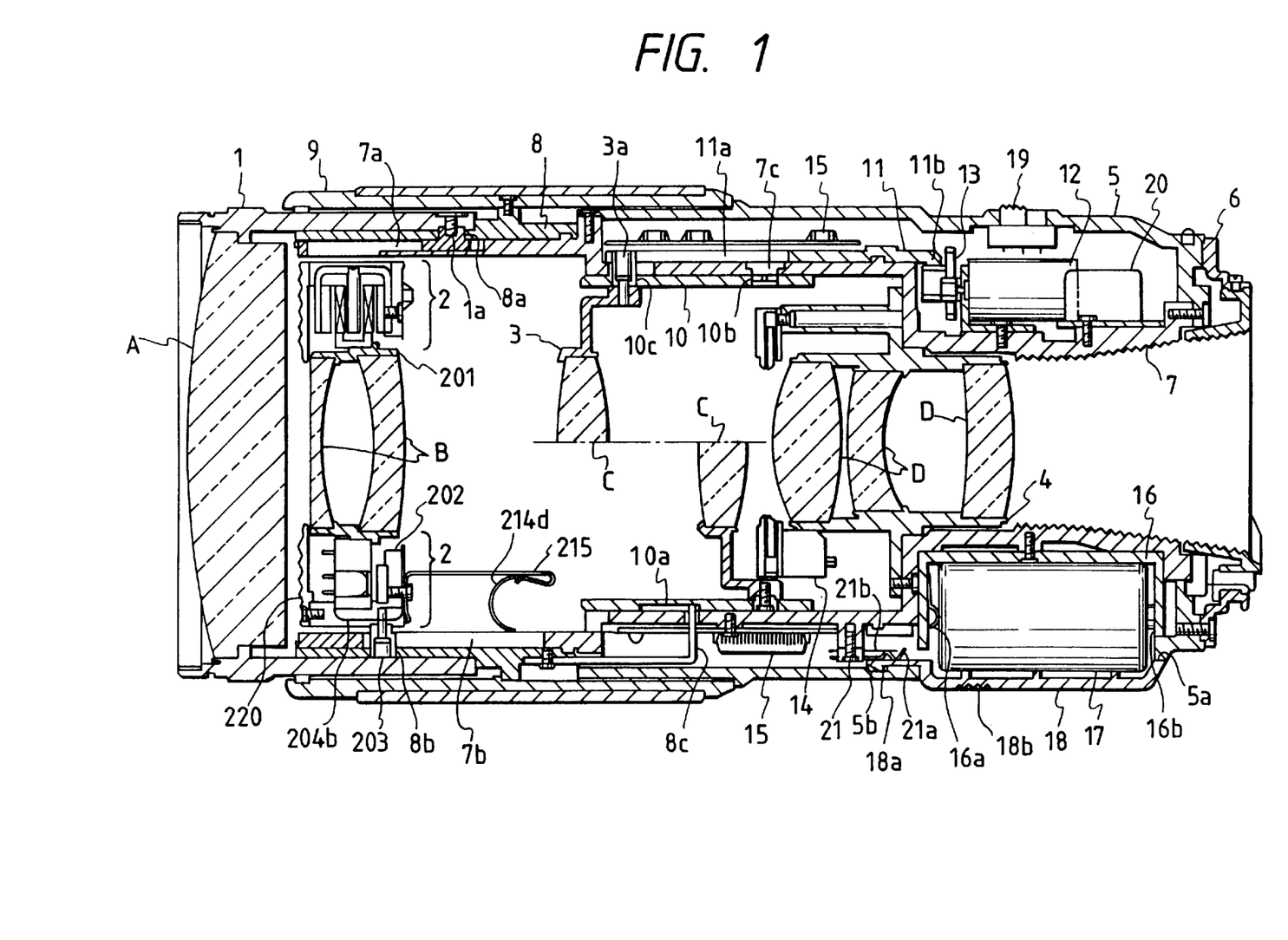
FIG. 1 is a cross-sectional view of a lens barrel, equipped with a vibration correcting device constituting an embodiment of the present invention.
Figure 2:
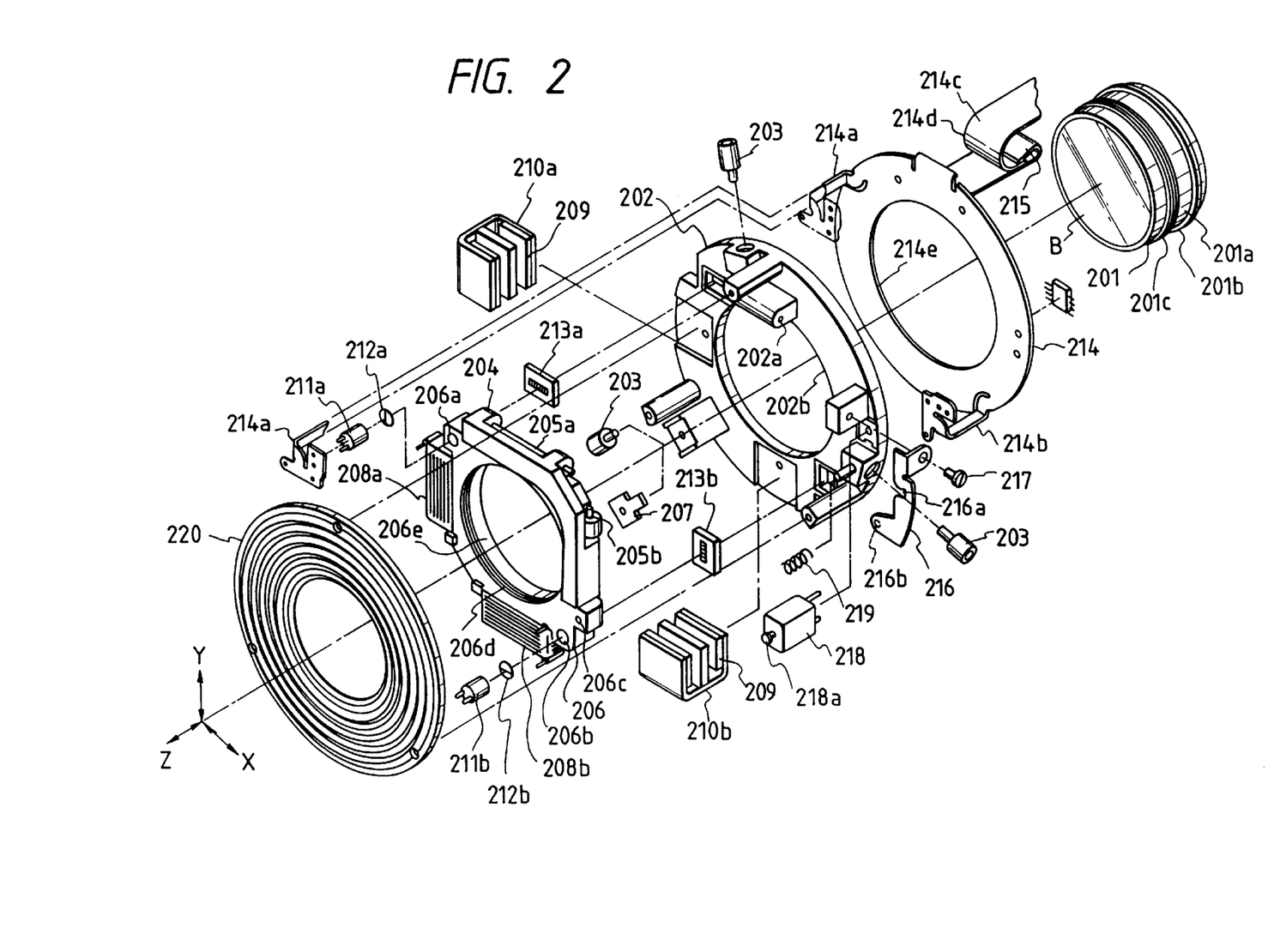
FIG. 2 is an exploded perspective view of a vibration correcting unit of a vibration correcting device, constituting an embodiment of the present invention.

FIGS. 1 and 2 illustrate an embodiment of the present invention, and are respectively a cross-sectional view of a zooming lens barrel incorporating a vibration correcting device, and an exploded perspective view of a vibration correcting unit.

In FIG. 1, optical lenses A–D (including correcting lenses B) are respectively fixed in a first group lens barrel 1, a lens supporting ring 201 constituting a part of a vibration correcting unit 2 to be explained later, and a third group lens barrel 3 and a fourth group lens barrel 4.

There are also shown an external tube 5 equipped with a mount 6 to be mounted on an unrepresented camera body, a fixed tube 7 fixed to said external tube 5 with screws, and a zoom cam tube 8 which is rotatable, integrally with a zooming ring 9, about the optical axis.

The first group lens barrel 1 is provided with a key 1a, engaging a cam groove 8a of the zoom cam tube 8 and with a straight groove 7a of the fixed tube 7. The vibration correcting unit 2 is provided with a base member 202 bearing a roller 203, which engages with a cam groove 8b of the zoom cam tube 8 and a straight groove 7b of the fixed tube 7. Consequently, rotation of the zooming ring 9 rotates the zoom cam tube 8, whereby the first group lens barrel 1 and the vibration correcting unit 2 move in the axial direction by a known cam mechanism. FIG. 1 illustrates the wide angle state, and a zooming operation toward the telephoto state causes frontward movement of the first group lens barrel 1 and rearward movement of the vibration correcting unit 2.

A focus cam tube 10, rotatably and axially movably supported inside the fixed tube 7, rotates and moves axially by the rotation of the zoom cam tube 8, through the engagement of a zoom key 8c fixed on the zoom cam tube 8 with a straight groove 10a and the engagement of a pin 7c provided on the fixed tube 7 with a cam groove 10b.

The third group lens barrel 3 is provided with a roller 3a, engaging a cam groove 10c of the focus cam tube 10 and a straight groove 11a of a focus driving tube 11, which is rendered rotatable in a fixed position outside the fixed tube 7. The focus driving tube 11 is rotated by a rear gear 11b, driven by a motor 12 through a reducing gear train 13, thereby displacing the third group lens barrel 3 in the axial direction and achieving the focusing operation.

The fourth group lens barrel 4 is provided at the front end thereof with a known diaphragm unit 14, and is fixed to the fixed tube 7.

A circuit board 15 with electric components effects focusing and diaphragm adjustment and controls the vibration correcting unit 2 by communication from the unillustrated camera body. A battery case 16, for housing a battery to be explained later, is fixed with screws to the rear part of the fixed tube 7 and is provided with contacts 16a, 16b which are wired (not shown) to a vibration prevention control circuit of the circuit board 15 mentioned above. A battery 17, constituting the power source for driving and controlling the vibration correcting unit 2, is composed, in the present embodiment, of two cylindrical lithium batteries so positioned that the cylindrical shape is parallel to the optical axis. A battery cover 18, for supporting the batteries 17 within the battery case 16 and ensuring stable electric power supply, is rendered slidable in the axial direction, with respect to the external tube 5.

For battery loading, at first the batteries 17 are pressed into the battery case 16 through an aperture 5a of the external tube 5, whereupon the batteries 17 are temporarily supported by the biasing force of the contacts 16a. Then the battery cover 18 is fitted into the aperture 5a of the external tube 5 from the rear and is made to slide frontward, whereupon a finger 18a of the battery cover 18 fits into a groove 5b provided on the internal periphery of the external tube 5 and the battery cover 18 is thus clamped. In case of replacement of the batteries 17, the battery cover 18 is moved backward while a front external part 18b is depressed, whereby the finger 18a is disengaged from the groove 5b of the external tube 5. It is thus made possible to remove the battery cover 18 and to replace the batteries 17.

A switch 19 is provided for selecting the vibration correcting operation. When this switch 19 is turned on, the vibration correcting unit 2 can be activated by communication with the camera body. A vibration sensor 20 for detecting the vibration of the camera, is composed, in the present embodiment, of a vibration gyro detecting the angular velocity.

The above-mentioned vibration sensor 20 is provided, respectively, at the upper part and the lateral part of the external periphery, in the vicinity of the mount, of the fixed tube 7, in order to detect the rotational vibration in the vertical (pitch) direction of the camera and that in the lateral (yaw) direction, when the lens barrel is mounted on the camera body. Each vibration sensor 20 is electrically connected to a vibration correcting control circuit of the circuit board 15, whereby the output of the sensor is converted into an angular displacement from which the amount of eccentric displacement of the correcting lens is calculated in consideration of the information on focal length and object distance and is utilized for drive control.

A battery cover switch 21, mounted on the fixed tube 7, is constructed so as to be closed by the contact of contact pieces 21a, 21b by the finger 18a of the battery cover 18 when it is mounted.

In the following there will be explained the structure of the vibration correcting unit 2, with reference to FIG. 2.

A base member 202 of the vibration correcting unit 2 is provided, at equal distances on the external periphery thereof, with three rollers 203, which engage with the cam grooves 8b of the zoom cam tube 8 and the straight grooves 7b of the fixed tube 7 shown in FIG. 1, whereby the entire vibration correcting unit 2 moves in the axial direction at the aforementioned zooming operation. A connecting arm 204, supported movably in the lateral direction (hereinafter called X-direction) with respect to a pin 205a, is provided in the vertical direction (hereinafter called Y-direction) with a pin 205b, which supports an eccentric movement frame 206 movably in the Y-direction.

The above-mentioned pin 205a is fixed in a hole 202a of the base member 202, whereby the eccentric movement frame 206 is rendered movable in the X and Y directions with respect to the base member 202. In order to prevent the frame 206 from moving in the axial direction (Z-direction), a guide plate 207 is fixed to the base member 202, and the eccentric movement frame 206 is sandwiched between the guide plate 207 and the base member 202.

On the eccentric movement frame 206 there are fixed voice coils 208a, 208b for driving respectively in the X and Y directions. Also on the base member 202, there are fixed, with screws, yokes 210a, 210b with magnets 209 in positions respectively corresponding to the voice coils 208a, 208b.

For detecting the eccentric position of the frame 206, light-emitting elements (IRED) 211a, 211b with slits 212a, 212b are fitted into holes 206a, 206b formed in the frame 206, and light-receiving elements (PSD) 213a, 213b are fixed on the base member 202.

A flexible printed circuit board 214, adhered on the rear face of the base member 202 and bearing circuit patterns and electric components constituting a part of the vibration correcting control circuit, is provided with a pair of frontward extended portions 214a, 214b which are respectively bent in a U-shape. Terminals of the aforementioned coil 208a and IRED 211a, provided on the frame 206, are inserted in and soldered to holes formed in the extended portion 214a, while those of the coil 208b and IRED 211b are similarly soldered to the extended portion 214b. The extended portions 214a, 214b are extended from the doughnut-shaped circuit board, in substantially opposite positions thereof. Also, the U-shape bent portions are respectively bent in mutually perpendicular X and Y directions, in order that the returning forces of the extended portions 214a, 214b, generated by bending, are uniformly applied to the frame 206 in the X and Y directions.

The flexible printed circuit board 214 is furthermore provided with an extended portion 214c, which is bent in rearward direction and guided to the rear part of the unit by means of a support member 215. The extended portion 214c is folded back toward the front at the end of the support member 215, and bent back again in a U-shape 214d toward the rear (cf. FIG. 1). The rear end of the extended portion 214c is electrically connected to the circuit board 15 for communication with the vibration correcting control circuit. As the vibration correcting unit 2 moves axially in the zooming operation, the above-mentioned bent portion 214d is provided to absorb such movement, thereby enabling stable signal communication.

Figure 3:
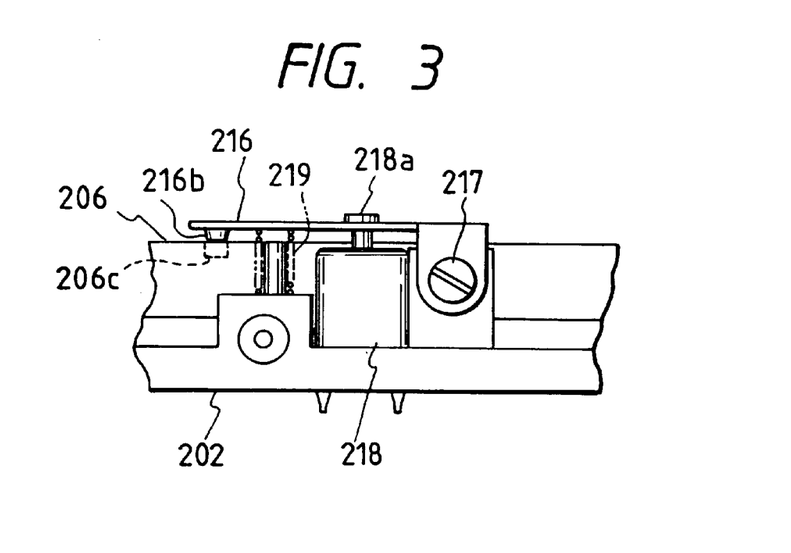
FIG. 3 is a partial lateral view of a correction optical system locking mechanism in FIG. 2.

In the following there will be explained, with reference to FIGS. 2 and 3, a locking mechanism for the correcting optical system (including the correcting lens B), in case a vibration correcting operation is deactivated.

A locking lever 216 is mounted on the base member 202 with a stepped screw 217 and is supported rotatably about said stepped screw 217. A plunger 218 provided therein with a solenoid is fixed to the base member 202 and is electrically connected to the flexible printed circuit board 214. A coil spring 219 is supported by the base member 202 and biases the locking lever 216 in a direction away from the plunger 218.

The plunger 218, when energized, attracts the locking lever 216 against the biasing force of the coil spring 219, by the engagement of a stepped portion of an actuating shaft 218a with a grooved portion 216a of the locking lever 216, and the attracted state is stabilized by an integral magnet and maintained even after the energization is turned off. In this state the eccentric movement frame 206 is driven to a central position and a projection 216b formed on the locking lever 216 enters a hole 206c of the frame 206 whereby said frame 206 is locked at said central position.

When inversely energized, the plunger 218 is released from the stabilized state, whereby the projection 216b of the locking lever 216 is disengaged from the hole 206c of the frame 206 by the biasing force of the coil spring 219, and the frame 206 is rendered capable of eccentric movement.

In assembling the vibration correcting unit 2, a lens support ring 201, supporting the correction lens B, is assembled after the positioning of the flexible printed circuit board 214 and the wirings of the coils 208a, 208b, IRED's 211a, 211b, PSD's 213a, 213b and plunger 218, in order to prevent eventual damage or smearing of the correcting lens B during assembly. Such procedure also enables the correcting lens B, which is expensive and requires many manufacturing steps, to be reused in case any defect is found during performance testing of the unit.

In the present embodiment, a lens unit composed of the correcting lens B, consisting of plural lens elements and fitted into the lens support ring 201, is inserted through an aperture 214e of the printed circuit board 214 and an aperture 202b of the base member 202 from the rear of the vibration correcting unit 2 and is fixed by engaging a screw thread portion 201c with a screw thread portion 206d of the eccentric movement frame 206. The lens support ring 201 is provided with a fitting surface 201a (for contacting the aperture 206e) for avoiding aberration in optical axis with respect to the frame 206, and an axial impinging face 201b for avoiding defocus.

A light shield plate 220, provided on the front face with light shield lines, is mounted on the assembled vibration correcting unit 2 after the performance test thereof, in order to prevent stray light to the PSD's 213a, 213b at the detection of the amount of eccentricity of the correcting lens B and to limit the effective light beam entering from the front end of the lens barrel.

The above-explained vibration correcting device functions in the following manner.

The lens barrel is at first mounted on the camera body, then a main switch thereof is turned on, and the vibration correction start switch 19 of the lens barrel is turned on, whereby the control circuit is powered from the battery 17. The vibration correcting operation is executed in linkage with a shutter release button of the camera body. More specifically, when the shutter release button is depressed by a half stroke, the locking mechanism is released by the plunger 218 as explained before and the correcting lens B is eccentrically moved according to the output of the vibration sensor 20, thereby achieving the vibration correcting operation. When the shutter release button is further depressed, a film exposing operation is executed in the already known manner. After this operation, the correcting lens B is driven to the central position and is locked by the plunger 218 again, whereby the vibration correcting operation is terminated. Also when the half-depressed state is cancelled by lifting the finger from the shutter release button, the correcting lens B is similarly locked after the lapse of a predetermined time, thus terminating the vibration correcting operation. Naturally, when the switch 19 is turned off, the correcting lens B is locked to terminate the vibration correcting operation.

The electric power of the battery 17 becomes gradually exhausted by the repetition of vibration correcting operations. In the present embodiment, the vibration correcting control circuit on the circuit board 15 detects the power level of the battery 17 and, if the detected level is identified as incapable of driving the correcting lens B, it is locked at the central position (where the optical axis of the correcting lens B coincides with the phototaking optical axis) and a vibration correcting operation is thus prohibited.

Also the vibration correcting control circuit, upon detecting the detachment of the battery cover 18 by means of the battery cover detecting switch 21, locks the correcting lens at the central position and prohibits a vibration correcting operation.

The vibration correction control circuit, upon detecting the detachment of the battery cover 18 by means of the battery cover detecting switch 21, immediately prohibits a vibration correcting operation and locks the correcting lens B at the central position, even if the vibration correction start switch 19 is turned on and if a vibration correcting operation is already in progress in response to a shutter releasing signal of the camera body. This is to prevent a situation in which the correcting lens B is unlocked and moves freely in the vibration correcting unit, in case the power supply is suddenly cut off in the course of a vibration correcting operation. This operation is to detect (by the switch 21) the detachment of the battery cover 18 as a preceding step for detachment of the battery 17 and to lock the correcting lens B at the central position while the electric power supply is continued by the biasing force of the contact piece 16a.

Consequently, even if the operator erroneously intends to replace the battery during a vibration correcting operation, the correcting lens B can be locked at the central position, thereby being prevented from generating an unpleasant cluttering sound or from damaging the correcting lens B itself or the vibration correcting unit 2.

In the above-explained embodiment, there is provided locking control means for activating the locking means to lock the correcting optical system in a predetermined position, irrespective of the function of the vibration correcting means, when the detachment of the battery is detected by the battery detecting means, whereby the correcting optical system is locked at the predetermined position in case the detachment of the battery is detected even if the vibration correction start switch is actuated and if a vibration correcting operation is already in progress.

It is therefore possible to prevent free movement of the correcting optical system within the lens barrel, even if the battery is detached by an erroneous operation.

Also in the above-explained embodiment, battery detecting means is constituted by switch means operable by the opening/closing operation of a battery cover member and, if detachment of the battery is predicted by this means, the mechanical locking means is activated to lock the correcting optical system at the predetermined position at the activation of the battery cover member, namely prior to the actual detachment of the battery from the battery chamber.

It is therefore rendered possible to dispense with the back-up power source for driving the locking means in case of detachment of the battery by an erroneous operation, thereby simplifying the magnitude of the circuits.

[Second embodiment]

Figure 4A:
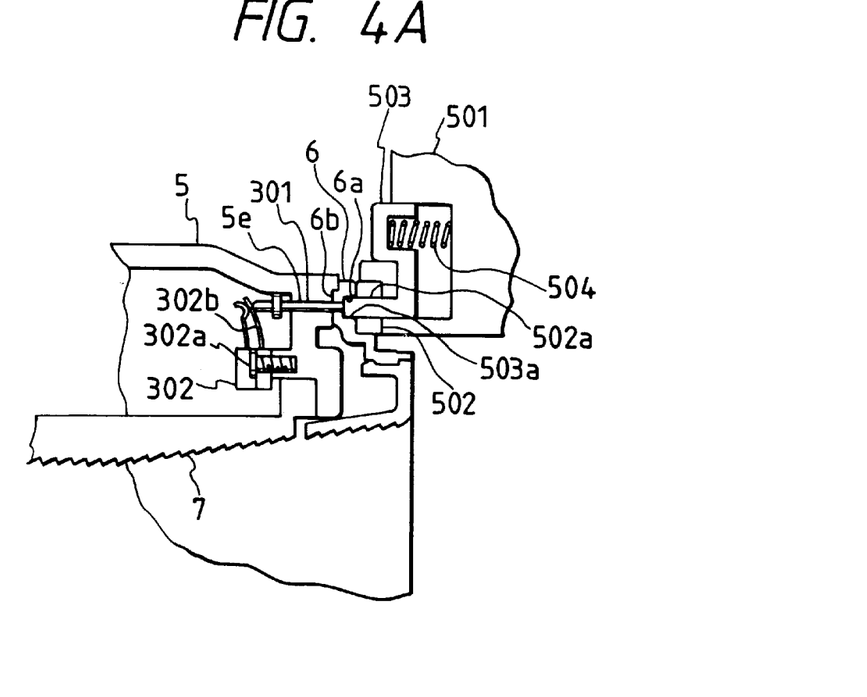
FIGS. 4A and 4B are partial cross-sectional views of an interchangeable lens with image blur preventing function, constituting a second embodiment of the present invention.
Figure 4B:
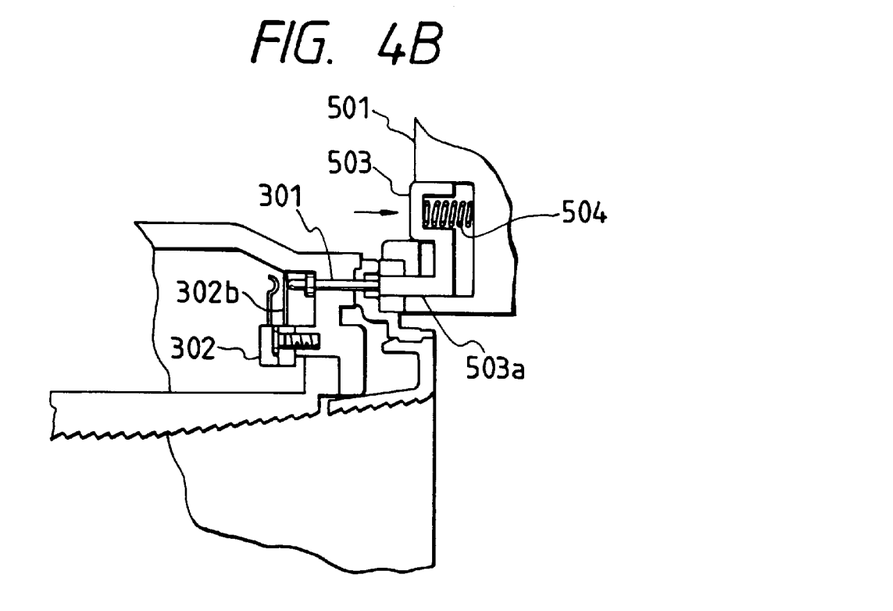
Figure 5:
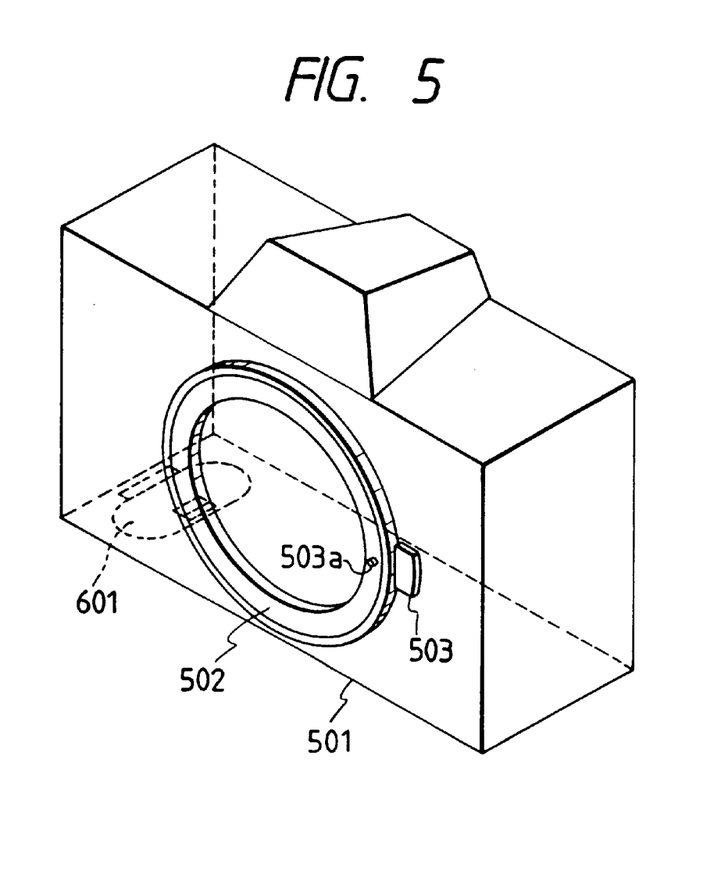
FIG. 5 is a perspective view of a camera body on which the interchangeable lens shown in FIGS. 4A and 4B are mountable.

FIGS. 4A, 4B and 5 illustrate a second embodiment of the present invention, wherein FIGS. 4A and 4B are partial cross-sectional views of a zoom lens barrel incorporating the vibration correcting device, in which the unillustrated parts are identical with those in the first embodiment, while FIG. 5 is a view of a camera body on which the zoom lens shown in FIGS. 4A and 4B is to be mounted.

In FIGS. 4A and 4B, the external tube 5, mount 6 and fixed tube 7 are similar to those in the first embodiment. The mount 6 is provided with a hole 6a for accepting a locking pin 503a of the camera body, to be explained later. An axially movably supported pin 301 penetrates a hole 5a provided in the external tube 5 and a small hole 6b provided at the bottom of the hole 6a of the mount 6. A switch 302 is fixed on the external tube 5 with a screw 302a, and the pin 301 is constantly biased toward the camera body by the biasing force of a contact piece 302b of the switch 302. The contact pieces of the switch 302 are connected to a control circuit (not shown) of the vibration correcting device in the lens barrel.

There are also shown a camera body 501 as also shown in FIG. 5, a body mount 502 fixed with screws (not shown) to the camera body 501 and adapted to engage with the lens mount 6, and a lens mount/detaching button 503, incorporated in a manner such that an operating button protrudes from the front face of the camera body, and provided with an integral locking pin 503 and a penetrating hole 502a provided in the body mount 502. The button 503 and the locking pin 503a are supported movably in the axial direction of the lens and are biased by a coil spring 504 toward the lens barrel.

In the following there will be explained the function of the above-explained device with reference to FIGS. 4A and 4B. FIG. 4A illustrates a state in which the lens barrel is mounted on the camera body. The mounting of the lens barrel to the camera body is achieved by bayonet coupling, by fitting the lens barrel with the body mount in a state rotated about the optical axis by a predetermined angle from the phototaking position and then rotating the lens barrel to the phototaking position. During this operation, the locking pin 503a is depressed into the body mount 502 by the end face of the lens mount 6, against the biasing force of the coil spring 504. When the lens barrel is rotated to the phototaking position, the locking pin 503a enters the hole 6a of the lens mount 6 by means of the coil spring 504, whereby the lens barrel becomes no longer rotatable and fixed to the camera body.

When the lens barrel is fixed to the camera body, the pin 301 is pressed, by the locking pin 503a, into the lens barrel to bring the contact piece 302b of the switch 302 with the other contact piece, thereby closing said switch 302.

On the other hand, FIG. 4B illustrates a state in which the detaching button 503 is depressed for detaching the lens barrel. By depression of the button 503 into the camera body, the locking pin 503a is disengaged from the hole 6a of the lens mount 6, whereby the lens barrel becomes rotatable and can therefore be detached from the camera body. At the same time, the pin 301 of the lens side is pressed by the contact piece 302b of the switch 302 and moves toward the camera body, whereby the contact piece 302b is separated from the other contact piece and the switch 302 is therefore turned off.

Figure 7:
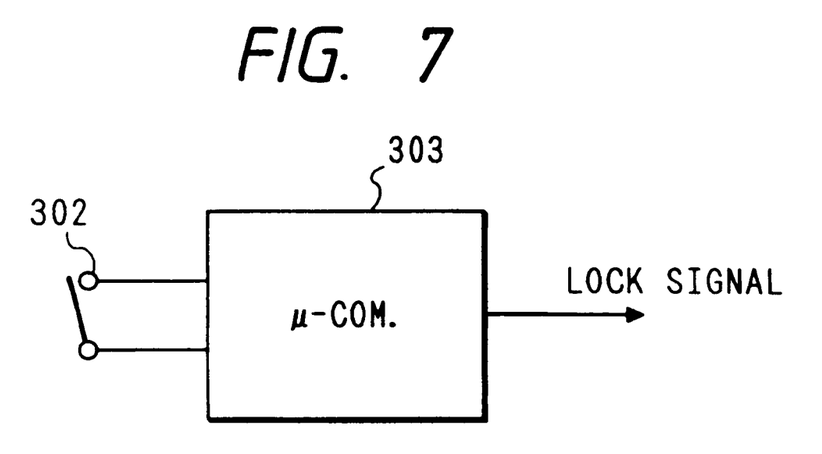
FIG. 7 is a block diagram showing a circuit for locking operation of the second embodiment of the present invention.
Figure 8:
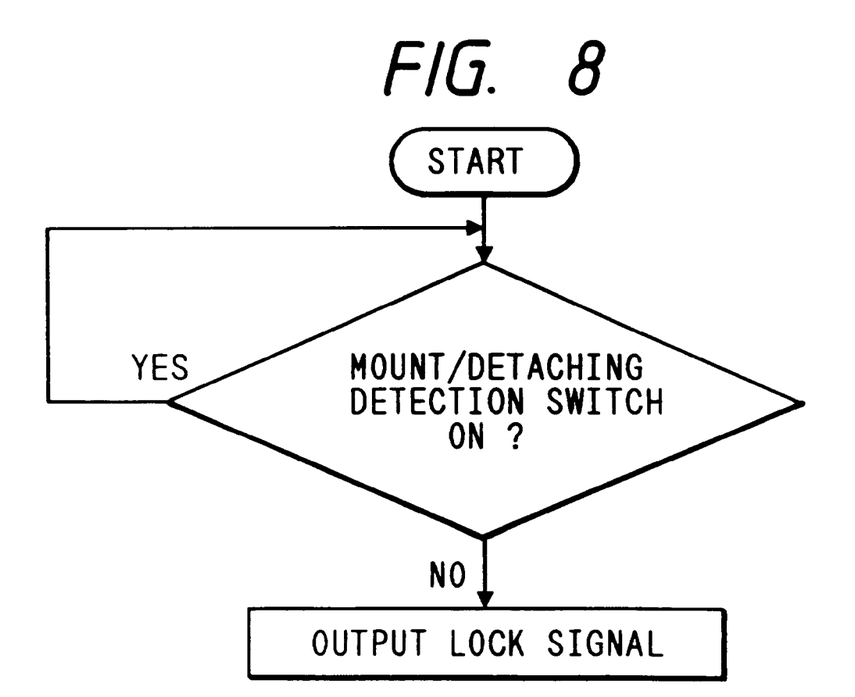
FIG. 8 is a flow chart showing an operation of the circuit of FIG. 7.

FIGS. 7 and 8 are block diagrams showing a circuit for locking operation of the embodiment and a flow chart showing an operation of the circuit, respectively.

In this second embodiment, the vibration correcting device is controlled by the state of the switch 302. More specifically, as shown in FIGS. 7 and 8, the correcting optical system is rendered movable only when the switch 302 is closed, whereby the correction of vibration is rendered possible only if the lens barrel is properly mounted on the camera body. Thus, regardless of the state of the vibration correcting start switch 19 as shown in the first embodiment or of the state of the power source, whenever the mount/detaching button 503 is depressed for detaching the lens barrel, in accordance with which a switch 302 is turned off, a signal for locking is outputted from the control circuit; the locking device is driven in response to the signal, thereby locking the correcting optical system at the predetermined position.

In the second embodiment, as the correcting optical system can be locked in response to the detection of the detachment of the lens barrel from the camera body as explained above, damage to the correcting device by the free movement of the correcting lens can be prevented even if the lens barrel is carelessly detached during the course of the vibration correcting operation. Also, as the depression of the detaching button is detected as a preparatory operation for the detachment of the lens barrel from the camera body, it is rendered possible to lock the correcting lens prior to the complete shut-off of the power supply not only in a case where the power source is provided within the lens barrel, as in the first embodiment, but also in a case where the electric power is supplied from the camera body. However, if the power source is provided in the lens barrel, as in the present embodiment, the locking operation may be executed in response to the detection of the actual detachment of the lens barrel.

In the present embodiment, since a switch as mount/detaching detecting means is provided with a lens barrel, it is possible, in any kind of camera body, to reliably lock a correcting lens by detecting a detachment of the lens barrel. Therefore, it is readily adaptable to an already completed camera system.

However, if a new camera is made in which the attachment state of the lens barrel can be communicated from the camera to the lens barrel, or if a system is provided in which signal transmitting can be performed like the above camera, the locking device may be operated by detecting a detachment of the lens barrel at the camera body side, and by transmitting the signal to the control circuit for vibration correction in the lens barrel.

In such a case, a leaf switch, which is turned ON in response to depressing a mount/detaching button in the camera body, is provided in the camera body. Wiring is performed in which the above signal is transmitted electrically to the control circuit for vibration correction by way of a contact part provided near the mount of the camera and the lens barrel in the same way as a communication of a lens data etc. is performed in a normal auto focussing mechanism. Consequently, since it is not necessary to provide a mechanical mount/detaching detection mechanism to respective lenses, a cost increase is prevented.

[third embodiment]

Figure 6A:
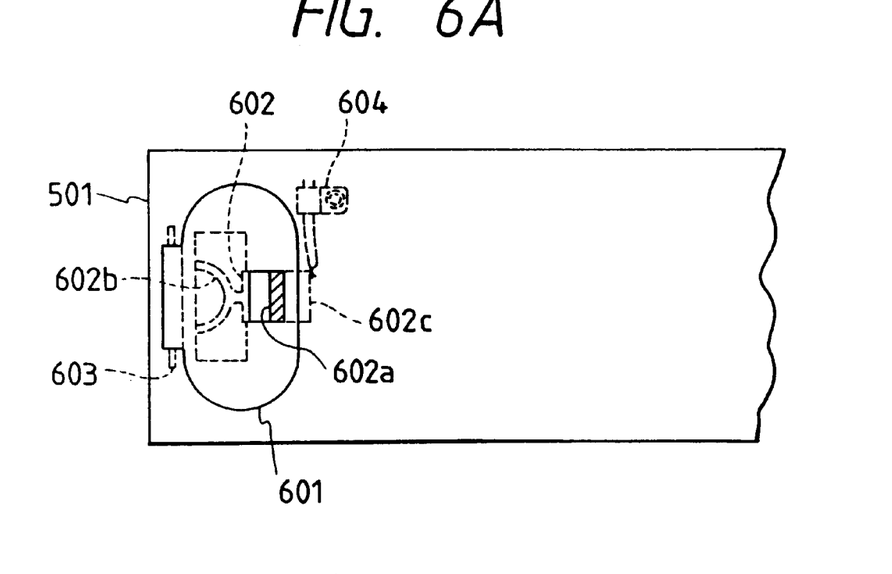
FIGS. 6A and 6B are partial cross-sectional views of a vibration correcting unit, constituting a third embodiment of the present invention.
Figure 6B:
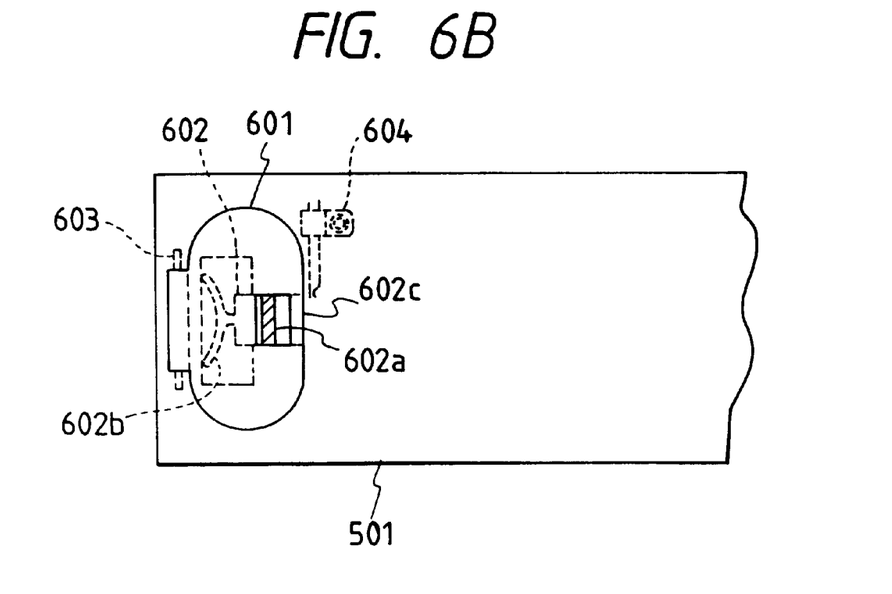

FIGS. 6A and 6B illustrate a third embodiment of the present invention, in which the electric power for correction of vibration is supplied from the camera body. These drawings illustrate the camera body seen from the bottom side thereof, wherein FIG. 6A shows a state in which a battery cover 601 is closed, while FIG. 6B shows a state in which a knob 602 is actuated for detaching the battery cover 601, as will be explained later.

Referring to FIG. 6A, a battery cover 601 is provided, at an end thereof, with a pin 603, about which the battery cover 601 is rotatable. For replacing the battery (not shown), a chamber therefor is opened by rotating the battery cover 601 toward the front side.

The battery cover 601 is provided with a laterally slidable knob 602, of which an operating portion 602 protrudes externally through a hole 601a provided in the battery cover 601. The knob 602 is integrally molded with a resinous material and is provided, at an end thereof, with a substantially semicircular leg portion 602b, of which elastic deformation biases the entire knob 602 toward the right of the drawing. The other end of the knob is formed as an engaging member 602c, adapted to engage with the camera body when the battery cover 601 is closed, thereby maintaining the battery cover in the closed state. A switch 604, fixed with a screw to the bottom of the camera body, is electrically connected with a vibration correcting control circuit in the lens barrel, through contacts provided in the mount.

In the following there will be explained the function of the third embodiment.

When the battery cover 601 is closed after the battery is loaded into the camera body, the engaging member 602c of the knob 602 engages the camera body with the elastic force of the leg portion 602b, whereby the battery cover 601 is maintained in the closed state. In this state the engaging member 602c presses a contact piece of the switch 604 to the other contact piece, thereby closing the switch 604. In this embodiment, correction vibration is rendered possible only when switch 604 is closed.

In the case of detaching the battery, the operating portion 602a of the knob 602 is moved to the left against the biasing force of the leg portion 602b, whereby the engaging member 602c is disengaged and the battery cover 601 is rendered rotatable. At the same time, the engaging member 602c is separated from the contact piece of the switch 604 to turn off the switch 604. Upon detection of such turning-off of the switch 604, the locking device is activated to lock the correcting lens, even if the vibration correcting operation is in progress.

In this manner, the correcting optical system can be securely locked when the detachment of the power supply is intended, even if a vibration correcting operation is in progress, so that the free movement of the correcting lens after shut-off of the power supply can be prevented.

In this third embodiment, the power source is provided in the camera body while the vibration correcting device is provided in the lens barrel, and the electric power supply for correction of vibration and the communication therefor are conducted through contacts provided in the mount portion, but this embodiment is effective also in a case in which the vibration correcting device and the phototaking lens are provided within the camera body. In a case where the power source for correction of vibration is provided in the interchangeable lens, there no longer exists the danger of shut-off of the electric power supply, but the correction of vibration after the detachment of the camera body is meaningless and is mere waste of electric power. It is therefore important to lock the correcting optical system whenever the lens barrel is detached from the camera body, regardless whether the power source is present or not.

The image blur preventing means of the present invention is not limited to use in a lens, but may also be provided in other optical equipment such as a camera or a video camera.

Also, the image blur preventing means of the present invention is not limited to a configuration utilizing a planar movement of an optical unit, but also includes other configurations involving other movements of an optical unit such as a rotational movement of the optical unit about a predetermined axis or involving a variable angle prism, or configurations achieving image blur prevention in electrically manner, for example by image processing.

Also, the driving means for moving the movable optical unit is not limited to the combination of voice coil and magnet, but may be composed of other driving means such as a motor or a stepping motor.

Furthermore, the image blur preventing means of the present invention is not limited to the purpose of image blur prevention, but may also be utilized for other purposes such as object tracking or panning without varying the direction of the equipment, or soft focusing for obtaining an intentionally blurred image.

Furthermore, the present invention is applicable not only to the power source for driving the optical unit but also to that for driving other movable members.

What is claimed is:

1. An optical apparatus to which an electric power supply portion for supplying electric power to the optical apparatus is detachable, the optical apparatus comprising:
   a main body;
   a movable member that prevents image blur by moving in accordance with a fluctuation of the optical apparatus;
   an operation portion provided on the main body of the optical apparatus, said operation portion being operable to perform a Preparatory operation prior to when the electric power supply portion is detached from the main body of the optical apparatus;
   a detection portion that detects a preparatory operation of said operation portion; and
   a restriction device that restricts movement of said movable member when said detection portion detects a preparatory operation of said operation portion.

2. An image blur prevention apparatus to which an electric power supply portion for supplying electric power to the image blur prevention apparatus is detachable, the image blur prevention apparatus comprising:
   a main body;
   a movable member that prevents image blur by moving in accordance with a fluctuation of said apparatus;
   an operation portion provided on the main body of the image blur prevention apparatus, said operation portion being operable to perform a preparatory operation prior to when the electric power supply portion is detached from the main body of the image blur prevention apparatus;
   a detection portion that detects a preparatory operation of said operation portion; and
   a restriction device that restricts movement of said movable member when said detection device detects a preparatory operation of said operation portion.

3. An apparatus according to claim 2, wherein the electric power supply portion comprises a battery.

4. An apparatus according to claim 2, wherein said restriction device comprises means for limiting an operation of said movable member by utilizing an operation of the electric power supply portion from a time when the operation portion performs a preparatory operation until the electric power supply portion is detached from the main body of the image blur prevention apparatus.

5. An apparatus according to claim 4, wherein said restriction device comprises means for performing a limiting operation by utilizing electric power supplied from the electric power supplying portion.

6. An apparatus according to claim 2, wherein said operation portion comprises a cover member for covering a space in the image blur prevention apparatus used to store an electric power supply portion.

7. An apparatus according to claim 6, wherein said detection portion detects an open or closed state of the cover member, and said restriction device restricts movement of the movable member in accordance with such detection.

8. An apparatus according to claim 7, wherein said restiction device restricts movement of the movable member in accordance with a dectection that the cover member is in an open state.

9. An apparatus according to claim 2, wherein said restriction device includes means for moving the movable member to a locked state with a locking portion.

10. An apparatus according to claim 9, wherein said locking portion includes means for mechanically engaging the movable member.

11. An apparatus according to claim 9, wherein said locking portion includes means for moving the movable member to a predetermined locking position.

12. An apparatus according to claim 2, wherein the movable member includes an optical unit for deflecting a light beam by movement thereof in an optical path.

13. An apparatus according to claim 2, wherein the movable member includes an image blur preventing optical unit for effecting image blur prevention by movement in response to image blur.

14. An optical apparatus used in connection with a camera in which a predetermined operation portion is operable prior to detachment of the optical apparatus from the camera, the optical apparatus comprising:
   image blur correction means for moving in response to a fluctuation state of the optical apparatus to correct image blur;
   a regulation device that regulates movement of said image blur correction means;
   movable means for moving mechanically interlocked with the predetermined operation portion when the predetermined operation portion is operated prior to detachment of said optical apparatus from said camera;
   a switch that detects movement of said movable means; and
   operation means for operating said regulation device to regulate movement of said image blur correction means in accordance with a detection of said switch.

15. An optical apparatus according to claim 14, wherein said predetermined operation portion is disposed on said camera body.

16. An optical apparatus according to claim 15, wherein the camera comprises means for moving said movable means, said means for moving being mechanically integrally with said predetermined operation portion.

17. An optical apparatus according to claim 14, wherein said switch includes means for generating an electrical signal in response to a change in moving state of said movable means.

18. An optical apparatus according to claim 14, wherein said regulation device includes means for mechanically restricting movement of said image blur correction means.

19. An optical apparatus according to claim 14, wherein said image blur correction means includes means for optically correcting image blur.

20. An optical apparatus according to claim 19, wherein said image blur correction means includes means for moving in a photographing optical path to deflect a light beam.

21. An optical apparatus according to claim 14, wherein said optical apparatus is an interchangeable lens.

* * * * *

UNITED STATES PATENT AND TRADEMARK OFFICE
CERTIFICATE OF CORRECTION

PATENT NO. : 5,943,169

DATED : August 24, 1999

INVENTOR(S): TADANORI OKADA

It is certified that error appears in the above-identified patent and that said Letters Patent is hereby corrected as shown below:

COLUMN 1,
Line 48, "Also" should read --Also,--.

COLUMN 5,
Line 5, "following" should read --following,--.

COLUMN 6,
Line 1, "following" should read --following,--.

COLUMN 7,
Line 8, "Also" should read --Also,--; and
Line 24, "Also" should read --Also,--.

COLUMN 8,
Line 41, "following" should read --following,--.

COLUMN 9,
Line 61, "|third" should read --|Third--.

COLUMN 10 ,
Line 20, "following" should read --following,--.

UNITED STATES PATENT AND TRADEMARK OFFICE
CERTIFICATE OF CORRECTION

PATENT NO. : 5,943,169

DATED      : August 24, 1999

INVENTOR(S): TADANORI OKADA

It is certified that error appears in the above-identified patent and that said Letters Patent is hereby corrected as shown below:

COLUMN 11,
Line 3, "cally" should read --cal--; and
Line 25, "Preparatory" should read --preparatory--.

COLUMN 12,
Line 49, "integrally" should read --integral--.

Signed and Sealed this

Sixteenth Day of May, 2000

Q. TODD DICKINSON

Attest:

Attesting Officer

Director of Patents and Trademarks